June 25, 1929.  A. M. DRUMMY  1,718,855
LUBRICATION INDICATOR FOR AUTOMOBILES
Filed Jan. 22, 1929
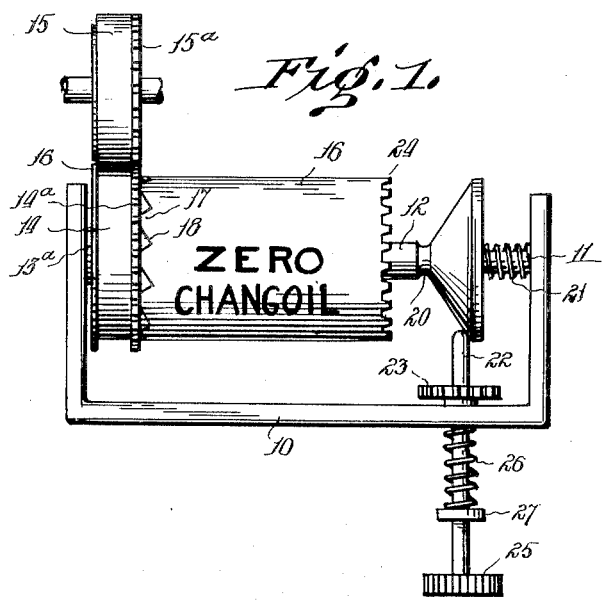
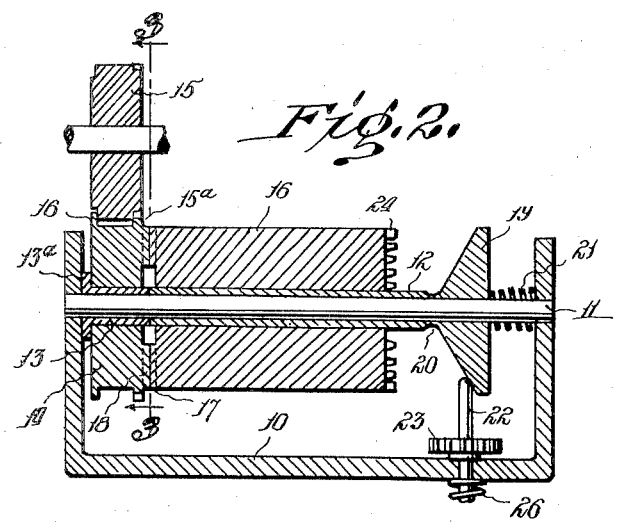
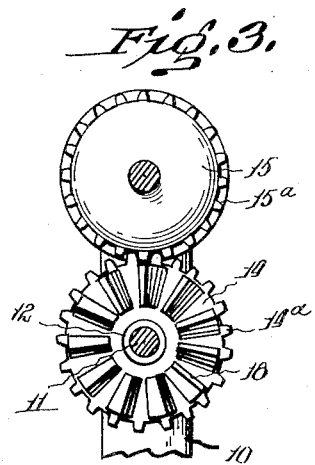
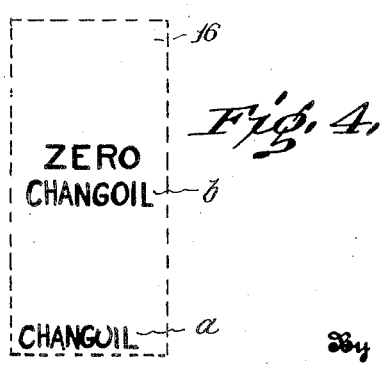
Inventor
Anthony M. Drummy
By Horace S. Peall
Attorney Patented June 25, 1929.

1,718,855

UNITED STATES PATENT OFFICE.

ANTHONY M. DRUMMY, OF LINCOLN, ILLINOIS.

LUBRICATION INDICATOR FOR AUTOMOBILES.

Application filed January 22, 1929. Serial No. 334,319.

My invention relates to automobile accessories, and more especially to the provision of an indicator operated from a rotatable part of the mechanism of the automobile or motor vehicle for the purpose of reminding the driver of a performance required in the proper operation of the same, as for instance when to change the lubricating oil in the crank case.

In the operation of an automobile or motor vehicle of this general type it is customary to change the oil in the crank case when the vehicle has been driven a certain number of miles, and it is usual to keep tab on this requirement by means of the mileage recorder of the speedometer in connection with a memorandum, but a reminder of this kind is unreliable and it is therefore the main object of my invention to provide an indicator to be located on the instrument board and operated by a rotatable part of the vehicle so that the driver may be definitely reminded when the lubricating oil should be changed.

It is a further object of my invention to provide an indicator of this kind which may be operated directly from one of the ground wheels of a motor vehicle or from one of the rotatable wheels of a speedometer, and which may be easily and conveniently set.

With these principal objects in view my invention consists of a rotatable drum containing indicia with reference to change of oil and having a clutch member engaging a companion member on a driven wheel, together with means for releasing the clutch and for moving the drum independently of the driven wheel; all as hereinafter fully described and specifically set forth in the appended claims.

In the accompanying drawings:

Figure 1 is an elevation of an indicator for automobiles constructed in accordance with my invention.

Fig. 2 is a longitudinal vertical sectional view.

Fig. 3 is a transverse sectional view on the line 3—3 of Fig. 2, and

Fig. 4 is a diagrammatc view of the drum on which the indicia is printed.

In carrying out my invention I mount the different parts of the mechanism in a supporting frame 10 for convenience in attaching the device to the instrument board of an automobile, said frame comprising a plate with upstanding member at the ends thereof between which is fixed a horizontal rod 11 on which is rotatably supported a slidable sleeve 12 and a collar 13 at one end of said sleeve, the collar having an outwardly projecting flange 13$^a$ bearing against one of the end members of the supporting frame.

Fixed to the collar is a wheel 14 adapted to be rotated by a driving wheel 15, for which purpose said wheels are provided with intermeshing gear teeth 14$^a$ and 15$^a$ respectively, and in order to prevent movement of the wheel 14 in the direction away from the adjacent member of the supporting frame it is provided at the outer edge of its periphery with a flange 16 engaging a corresponding groove in the companion wheel 15. The wheel 14 is adapted to turn the drum 16 on which the indicia is printed, said drum being fixed to the sleeve 12 and provided at one end with a series of clutch teeth 17 in mesh with clutch teeth 18 on said driving wheel, whereby the drum may be moved into and out of gear for the purpose hereinafter set forth. The sleeve projects beyond the end of the drum opposite that on which the clutch teeth are formed, and at this end said sleeve is provided with a cone-shaped member 19 the inclined face of which extends towards the drum and joins an annular groove 20 in the sleeve, a helical spring 21 being interposed between the cone-shaped member and adjoining end piece of the supporting frame to actuate the sleeve and parts carried thereby towards the driving wheel for the normal engagement of the clutch teeth. As hereinbefore stated the drum carries the indicia of the indicator and is turned by the clutch wheel 14 in mesh with driving wheel 15, and it will be understood of course that the driving wheel is operated from a ground wheel of the motor vehicle either directly by means of a flexible shaft such as is ordinarily used for driving a speedometer, or it may be one of the mileage wheels of the speedometer preferably the one representing 100 miles with the desired ratio of movement between said driving wheel and drum to provide for the proper spacing of the indicia with respect to the periphery of the drum. The indicia in the present instance is for indicating when the driver or owner of the car should change the oil in the crank case, and therefore consists of the words "Zero" and "Changoil," the latter being repeated one or more times, as shown in the diagrammatic view Fig. 4, but of course other indicia may be printed on the drum as desired. One of the indicia, as $a$, may be printed in one color, as black, and the other b in red, so that one may be brought into view at 500 miles after "Zero" and the other 1,000 miles, or the mileage represented between the indicia may be increased or decreased as desired.

In order to return the drum to zero it is only necessary to move it so as to disengage the clutch faces and turn said drum either forward or backward, the operation being accomplished by simply sliding the sleeve and drum to which it is fixed against the action of the spring by means of the cone-shaped member which latter may also provide the means for turning the parts. However, as the device is intended to be attached to the inner side of the instrument board the drum is returned to zero by means of a rod 22 extending through the instrument board and plate of the supporting frame 10 so as to engage the inclined face of the cone-shaped member, said rod being provided at a suitable distance from its inner end with a pinion 23 for engagement with gear teeth 24 on the end of the drum, whereby when the rod is pushed inward it will ride on the inclined face of the cone-shaped member and slide said member with the sleeve and drum to which it is connected against the action of the spring 21 to disengage the clutch faces and simultaneously engage the pinion with the gear teeth, the rod being then turned for rotation of the drum by means of the pinion and gear teeth. For manipulating the rod the outer end thereof is provided with a knurled wheel 25, and for returning it to normal position with the clutch in engagement a spring 26 is interposed between the frame 10 and disk 26 fixed to the rod.

From the foregoing description in connection with the accompanying drawings the construction and operation of the indicating device will be readily understood, for the drum being geared to the ground wheel of the motor vehicle and set with the zero mark visible through a suitable aperture in the instrument board the indicia "changoil" will appear through the aperture when the vehicle has travelled a certain number of miles thereby indicating that the oil should be changed, and the indicator may then be reset to zero by manipulating the rod in the manner hereinbefore set forth. The indicia may provide for changing the oil at any number of mileage desired and as each mark on appearing at the sight opening is in view during the travel of the vehicle for approximately 100 miles ample warning is given with regard to the record which it indicates.

I claim:

1. A lubrication indicator for automobiles comprising a crossbar supported in a frame, a driving wheel and drum rotatably mounted on the crossbar with one of said elements slidable with respect to the other, a clutch connecting the driving wheel and drum, and a spring actuating the slidable element for the normal engagement of the clutch.

2. A lubrication indicator for automobiles comprising a crossbar supported in a frame, a driving wheel and drum rotatably mounted on the crossbar with one of said elements slidable with respect to the other, a clutch connecting the driving wheel and drum, and a spring actuating the slidable element for the normal engagement of the clutch; together with means for moving the slidable element for the disengagement of the clutch, and means for turning said drum independently of the driving wheel.

3. A lubrication indicator for automobiles comprising a crossbar supported in a frame, a collar and a sleeve rotatably mounted on the crossbar end to end, the sleeve being slidable with respect to the collar, a driving wheel fixed to the collar, a drum fixed to the sleeve, a clutch connecting the driving wheel and drum, and a spring actuating the slidable drum for normal engagement of the clutch; together with means for moving the sleeve and drum for the disengagement of the clutch, and means for turning the drum independently of the driving wheel.

4. A lubrication indicator for automobiles comprising a crossbar supported in a frame, a driving wheel and drum rotatably mounted on the crossbar with one of said elements slidable with respect to the other, a clutch connecting the driving wheel and drum, and a spring actuating the slidable element for the normal engagement of the clutch; together with a cone-shaped member carried by the slidable element, and a slidable rod engaging the inclined face of the cone-shaped member for moving said cone-shaped member and parts carried thereby to disengage the clutch for movement of the drum independently of the driving wheel.

5. A lubrication device for automobiles comprising a crossbar supported in a frame, a driving wheel and drum rotatably mounted on the crossbar with one of said elements slidable with respect to the other and having gear teeth at one end thereof, a clutch connecting the driving wheel and drum, and a spring actuating the slidable element for the normal engagement of the clutch; together with a cone-shaped member carried by the slidable element spaced adjoining the gear teeth thereon, a slidable operating rod engaging the inclined face of the cone-shaped member to move said cone-shaped member and parts carried thereby for disengaging the clutch, and a pinion fixed to the rod for engaging the aforementioned gear teeth for turning the cone-shaped member and parts carried thereby.

6. A lubrication device for automobiles comprising a crossbar carried by a frame, a driving wheel rotatably mounted on one end of the crossbar and having clutch teeth at one side thereof, a drum rotatably and slidably mounted on the crossbar and having clutch teeth at one end for engagement with the clutch teeth on the driving wheel, gear teeth on the end of the drum opposite the clutch teeth, and a spring for moving the drum for normal engagement of the clutch; together with a slidable rod for moving the drum on the crossbar, and a pinion on said slidable rod engaging the gear teeth on the drum for turning the same.

7. A lubrication device for automobiles comprising a crossbar carried by a frame, a driving wheel rotatably mounted on one end of the crossbar and having clutch teeth at one side thereof, a drum rotatably and slidably mounted on the crossbar and having clutch teeth at one end for engagement with the clutch teeth on the driving wheel, gear teeth on the end of the drum opposite the clutch teeth, and a spring for moving the drum for normal engagement of the clutch; together with a cone-shaped member carried by the drum, a slidable rod engaging the inclined face of said cone-shaped member for moving the drum to disengage the clutch, and a pinion on the rod adapted to engage the gear teeth on the drum for turning the latter.

8. A lubrication device for automobiles comprising a crossbar carried by a frame, a driving wheel rotatably mounted on one end of the crossbar and having clutch teeth at one side thereof, a drum rotatably and slidably mounted on the crossbar and having clutch teeth at one end for engagement with the clutch teeth on the driving wheel, gear teeth on the end of the drum opposite the clutch teeth, and a spring for moving the drum for normal engagement of the clutch; together with a cone-shaped member carried by the drum and spaced adjoining the gear teeth thereon, a push-rod spring actuated to normally engage the outer portion of the inclined face of the cone-shaped member on the drum, and a pinion fixed to the rod and adapted to engage the gear teeth on the drum when the latter is moved by said rod to disengage the clutch.

9. A lubrication device for automobiles comprising a crossbar carried by a frame, a driving wheel rotatably mounted on one end of the crossbar and having clutch teeth at one end and a projecting annular flange at the other end, an auxiliary driving wheel geared to the aforementioned driving wheel and having a groove receiving the flange thereon, a drum rotatably and slidably mounted on the crossbar and having clutch teeth at one end for engagement with the clutch teeth on the driving wheel and gear teeth at the other end, a cone-shaped member carried by the drum adjoining said gear teeth, and a spring interposed between the cone-shaped member and supporting frame for moving the drum for normal engagement of the clutch; together with a slidable push-rod the inner end of which engages the inclined face of the cone-shaped member, a spring for moving the rod outwardly with respect to the action of the cone-shaped member, and a pinion fixed to the rod and adapted to mesh with the gear teeth on the drum when the latter is moved to disengage the teeth.

10. A lubrication device for automobiles comprising a crossbar carried by a frame, a driving wheel rotatably mounted on one end of the crossbar and having clutch teeth at the inner side thereof, a sleeve rotatably and slidably mounted on the crossbar, a drum fixed to the sleeve and having clutch teeth at its inner end adapted to engage the clutch teeth on the driving wheel and gear teeth at its outer end, a cone-shaped member on the outer end of the sleeve beyond the outer end of the drum and having its inclined face towards said drum and a groove around the sleeve at the smaller end of said cone-shaped member, a spring interposed between the cone-shaped member and supporting frame for moving the drum to engage the clutch, a slidable push-rod engaging the inclined face of the cone-shaped member, and a pinion fixed to the rod adapted to engage the gear teeth on the drum for turning the latter when the clutch is disengaged.

ANTHONY M. DRUMMY.